(12) United States Patent
Dev (10) Patent No.: US 12,502,565 B1
(45) Date of Patent: *Dec. 23, 2025

(54) ACTIVE FORCE ELECTRIC FIELD ANTI-PATHOGENIC FABRIC AND METHODS OF CHARGING AND DEACTIVATING PATHOGEN PARTICLES

(71) Applicant: Florida A&M University, Tallahassee, FL (US)

(72) Inventor: Satyanarayan Dev, Tallahassee, FL (US)

(73) Assignee: Florida A&M University, Tallahassee, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/744,790

(22) Filed: Jun. 17, 2024

Related U.S. Application Data (63) Continuation of application No. 17/301,954, filed on Apr. 20, 2021, now Pat. No. 12,011,622.

(Continued)

(51) Int. Cl.
| | |
|---|---|
| *A41D 13/00* | (2006.01) |
| *A41D 13/11* | (2006.01) |
| *A41D 31/30* | (2019.01) |
| *A62B 7/10* | (2006.01) |
| *A62B 23/02* | (2006.01) |

(Continued)

(52) U.S. Cl.
CPC ........ *A62B 23/025* (2013.01); *A41D 13/1192* (2013.01); *A41D 31/305* (2019.02); *A62B 7/10* (2013.01); *B01D 39/18* (2013.01); *B01D 39/2031* (2013.01); *D03D 1/0035* (2013.01); *D03D 15/217* (2021.01); *D03D 25/00* (2013.01); *D06M 16/00* (2013.01); *A41D 2500/20* (2013.01); *B01D 2239/0241* (2013.01); *B01D 2239/0407* (2013.01); *B01D 2239/0435* (2013.01); *B01D 2239/0442* (2013.01); *B01D 2239/0492* (2013.01);

(Continued)

(58) Field of Classification Search
CPC ....... A62B 23/025; A62B 23/02; A41D 13/11; A41D 13/1192; A41D 31/30; A41D 31/305
USPC ........................................................ 128/863
See application file for complete search history.

(56) References Cited

U.S. PATENT DOCUMENTS

| | | | | |
|---|---|---|---|---|
| 4,856,509 A | * | 8/1989 | Lemelson ............ | A62B 23/025 128/206.16 |
| 12,011,622 B1 | * | 6/2024 | Dev ........................ | A62B 7/10 |

(Continued)

*Primary Examiner* — Adam Baker
(74) *Attorney, Agent, or Firm* — Trenam Law (57) ABSTRACT

Described herein relates to an active force electric field anti-pathogenic fabric device and methods thereof used to remove pathogens from an environment surrounding the fabric. The device may be woven into daily clothing items, personal protective equipment, and/or other clothing items typically worn by a user. The device may include a current-carrying mesh that may be coated with active materials used to remove pathogens from the air. As such, the device may operate as an anti-pathogenic material that may be used to remove harmful particles from an area surrounding a user. Accordingly, microorganisms, smoke particles, industrial pollutants, odor molecules, and/or allergens may be structurally disassociated into harmless protein fragments and/or natural molecules when encountering the purifying agents in the device.

18 Claims, 4 Drawing Sheets

Related U.S. Application Data

(60) Provisional application No. 63/012,620, filed on Apr. 20, 2020.

(51) Int. Cl.
*B01D 39/18* (2006.01)
*B01D 39/20* (2006.01)
*D03D 1/00* (2006.01)
*D03D 15/217* (2021.01)
*D03D 25/00* (2006.01)
*D06M 16/00* (2006.01)
*D06M 101/06* (2006.01)

(52) U.S. Cl.
CPC ............... *B01D 2239/0613* (2013.01); *B01D 2239/065* (2013.01); *D06M 2101/06* (2013.01)

(56) References Cited

U.S. PATENT DOCUMENTS

| | | | | |
|---|---|---|---|---|
| 2011/0296584 A1* | 12/2011 | Kuo | ............... | A62B 23/025 |
| | | | | 2/206 |
| 2016/0016022 A1* | 1/2016 | Qian | ............... | A62B 23/025 |
| | | | | 128/206.12 |

\* cited by examiner

ACTIVE FORCE ELECTRIC FIELD ANTI-PATHOGENIC FABRIC AND METHODS OF CHARGING AND DEACTIVATING PATHOGEN PARTICLES

CROSS-REFERENCE TO RELATED APPLICATIONS

This Nonprovisional Patent application is a continuation of and claims the benefit of U.S. Nonprovisional patent application Ser. No. 17/301,954 entitled, "ACTIVE FORCE ELECTRIC FIELD ANTI-PATHOGENIC FABRIC AND METHODS OF CHARGING AND DEACTIVATING PATHOGEN PARTICLES" filed Apr. 20, 2021 by the same inventor, which claims priority to U.S. Provisional Patent Application No. 63/012,620 entitled "ACTIVE FORCE ELECTRIC FIELD ANTI-PATHOGENIC FABRIC" filed Apr. 20, 2020 by the same inventor, all of which are incorporated herein by reference, in their entireties, for all purposes.

BACKGROUND OF THE INVENTION

1. Field of the Invention

This invention relates, generally, to pathogen eradication fabrics. More specifically, it relates to active force electric field anti-pathogenic fabrics that impart a charge on surrounding particles, including pathogens, to remove the pathogens from the surrounding area.

2. Brief Description of the Prior Art

Fabrics used to filter and prevent pathogens and other particles from reaching a respiratory tract of a user are increasing in importance, provided the prevalence of airborne viruses and bacteria, such as severe acute respiratory syndrome coronavirus 2 (SARS-CoV-2). For example, surgical masks provide a fabric barrier between a user and an exterior environment, such that at least a portion of contaminants surrounding the user do not penetrate through the masks. However, most protective fabrics that provide such a barrier are incapable of reuse and are limited to a singular use by the wearer, requiring replenished supplies of unused fabrics and contributing to excessive waste materials as used fabrics are designed to be disposable. To date, cloth fabrics have proven to be washable and reusable, but require an additional disposable filter material to be effective against particle transmission. Accordingly, regardless of the type of fabric, the current state of the art contributes to the inefficiencies associated with wasted materials.

In addition, respirators exist that filter particles or purify air surrounding the respirators, some of which may be reusable to provide non-temporary protection against particle transmission. However, such respirators are typically complex to manufacture and expensive due to the intricate component parts used therein. For example, devices exist that impart a charge on particles, including linen fibers. However, such devices typically require the use of ultraviolet lights or irradiation devices to impart the charge on the mesh, increasing the complexity of the devices and the associated costs.

Accordingly, what is needed is a reusable fabric that can be used to not only serve as a barrier to contaminants, but can also function to remove contaminants from the environment surrounding a user. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an effective and simple fiber structure including an electric field used as an anti-pathogenic material is now met by a new, useful, and nonobvious invention.

The novel anti-pathogenic fabric device may include a wearer-facing side opposite a surrounding environment-facing side, such that the wearer-facing side may be configured to reside adjacent to at least one portion of a surface (e.g., skin and/or respiratory tract) of a wearer. In an embodiment, a first fiber layer of the fabric device may be disposed proximate to the wearer-facing side, with the first fiber layer including a plurality of interwoven fiber strand(s) forming a first mesh. In this embodiment, the first fiber layer may include an amount (e.g., at least one) of hemp fiber strands which may be interwoven with an amount of natural non-hemp fiber strands and/or an amount of synthetic fiber strands. Additionally, a second fiber layer may be disposed proximate to the surrounding environment-facing side, such that the second fiber layer may be spaced apart from the first fiber layer. Similarly, in this embodiment, the second fiber layer may also include an amount (e.g. at least one) of hemp fiber strand(s) which may be interwoven with an amount of natural non-hemp fiber strands and/or an amount of synthetic fiber strands.

In some embodiments, a photocatalytic layer may coat at least one portion of a surface of the second fiber layer, such that the second fiber layer may be disposed between the photocatalytic layer and the first fiber layer. In this manner, the photocatalytic layer may be configured to form a first contact surface for at least one of a plurality of pathogenic particles translating in a direction toward the surrounding environment-facing side of the wearable device.

In addition, in some embodiments, at least one copper naphthenate particle may be distributed on an outward-facing surface of the photocatalytic layer. As such, in these other embodiments, the at least one copper naphthenate particle and/or the photocatalytic layer may be configured to impart an electrical charge onto the at least one of the plurality of pathogenic particles translating in the direction toward the surrounding environment-facing side of the wearable device. Moreover, in these other embodiments, the second fiber layer and/or the first fiber layer may be configured to capture the at least one of the plurality of electrically charged pathogenic particles, such that the second fiber layer and/or the first fiber layer may prevent the at least one of the plurality of electrically charged pathogenic particles from traversing beyond the first fiber layer and/or the second fiber layer, preventing interaction between the at least one of a plurality of electrically charged pathogenic particles and the wearer.

In some embodiments, the fabric device may be incorporated into a wearable device, such as a face mask that may be configured to cover a respiratory tract of the wearer. In this manner, in these other embodiments, the fabric device being configured as the face mask may prevent the at least one of a plurality of electrically charged pathogenic particles from reaching the respiratory tract of the wearer.

In some embodiments, at least one portion of the surface of the first fiber layer and/or the second fiber layer may also be coated with a tetrafluoroethylene layer. For example, a tetrafluoroethylene layer may be disposed between the first fiber layer and the second fiber layer, and/or a tetrafluoroethylene layer may be disposed between the second fiber layer and the photocatalytic layer.

In some embodiments, a plurality of microcapsules may be incorporated into the first fiber layer and/or the second fiber layer. As such, at least one of the plurality of microcapsules may comprise an amount of a microbial substance therein, such that the at least one of the plurality of microcapsules may be configured to release the amount of the microbial substance via a controlled release.

Another aspect of the present disclosure pertains to a method of manufacturing a wearable fabric device and/or capturing at least one of a plurality of pathogenic particles, via the wearable fabric device. In an embodiment, the method may include a step of interweaving a first plurality of fiber strands into a first fiber layer. In this embodiment, at least one of the first plurality of fiber strands may comprise a hemp fiber strand. In addition, the method may comprise a step of interweaving a second plurality of fiber strands into a second fiber layer. In this same manner, at least one of the second plurality of fiber strands may comprise a hemp fiber strand. In this embodiment, the method may further comprise the step of coating at least one portion of a surface of the second fiber layer with a photocatalytic layer, such that the photocatalytic layer may form an outer contact surface. Moreover, the method may also include the step of, distributing at least one copper naphthenate particle about at least one portion of a surface of the photocatalytic layer. In this manner, the first fiber layer, the second fiber layer, the photocatalytic layer, and/or the at least one copper naphthenate particle may be configured to form the wearable fabric device, such that the wearable fabric device may be configured to reside adjacent to a skin surface of a wearer. Additionally, int his embodiment, the at least one copper naphthenate particle and/or the photocatalytic layer may charge at least one of a plurality of pathogenic particles surrounding the outer contact surface. Accordingly, in this embodiment, subsequent to charging at least one of the plurality of pathogenic particles, the method may include the step of, capturing, via the second fiber layer and/or the first fiber layer, at least one of the plurality of charged pathogenic particles, such that at least one of the plurality of charged pathogenic particles may be prevented from reaching the skin surface of the wearer.

In some embodiments, the method may include the step of, energizing the photocatalytic layer to interact with ambient air surrounding the outer contact surface, such that a plurality of hydroxyl radicals may be formed on the outer contact surface. As such, in these other embodiments, the step of charging at least one of a plurality of pathogenic particles may also include the step of, reacting at least one of the plurality of charged pathogenic particles with the plurality of hydroxyl radicals.

In some embodiments, the wearable fabric device may comprise a face mask, such that the wearable fabric device may cover a respiratory tract of the wearer. In this manner, in these other embodiments, the wearable fabric device may be configured to be subjected to at least one cleaning agent and/or an amount of water. As such, in these other embodiments, the method may include the step of, subjecting, the wearable fabric device to the at least one cleaning agent and/or the amount of water, such that the wearable fabric device configured as the face mask may be reusable.

An object of the invention is to provide an effective and simple fiber structure used not only to prevent contaminants from reaching a user, but also to eradicate the contaminants via a charged field surrounding the fiber.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

As used herein, the term "mechanical communication" refers to any coupling mechanism configured to transmit and/or exchange any force known in the art using any methods and/or device known in the art. Non-limiting examples of mechanical communication may include mechanical coupling, clamps, universal joint, sleeve coupling, roller chain coupling, flange coupling, and/or flange couplings. For ease of reference, the exemplary embodiment described herein refers to mechanical coupling, but this description should not be interpreted as exclusionary of other mechanical coupling mechanisms.

As used herein, the term "coupling mechanism" refers to any apparatus known in the art configured to temporarily affix one object to at least one alternative object. Non-limiting examples of the coupling mechanism may include a screw, a nail, a rivet, a magnet, and/or an adhesive. For ease of reference, the exemplary embodiment described herein refers to a screw, but this description should not be interpreted as exclusionary of other coupling mechanisms.

As used herein, the terms "about," "approximately," or "roughly" refer to being within an acceptable error range (i.e., tolerance) for the particular value as determined by one of ordinary skill in the art, which will depend in part on how the value is measured or determined (e.g., the limitations of a measurement system) (e.g., the degree of precision required for a particular purpose, such as imparting a charge on surrounding particles, including pathogens, to remove the pathogens from a surrounding area). As used herein, "about," "approximately," or "roughly" refer to within ±25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Wearable Anti-Pathogenic Fabric Device

The present invention includes the use of an active force electric field anti-pathogenic fabric device (hereinafter "fabric device") to remove pathogens from an environment surrounding the fabric. In an embodiment, the fabric device may be woven into daily clothing items, personal protective equipment, and/or any other clothing items known in the art typically worn by a user. The fabric device may also include a current-carrying mesh that may be coated with active materials used to remove pathogens from the air. As such, the fabric device may be configured to operate as an anti-pathogenic material, such that the fabric device may be used to remove harmful particles from an area surrounding a user.

In this manner, in this embodiment, the purifying agents disposed within at least one portion of the fabric device may act on microorganisms, smoke particles, industrial pollutants, odor molecules, and/or allergens, such that the fabric device may structurally disassociate the particulates into harmless protein fragments and/or natural molecules.

Figure 1:
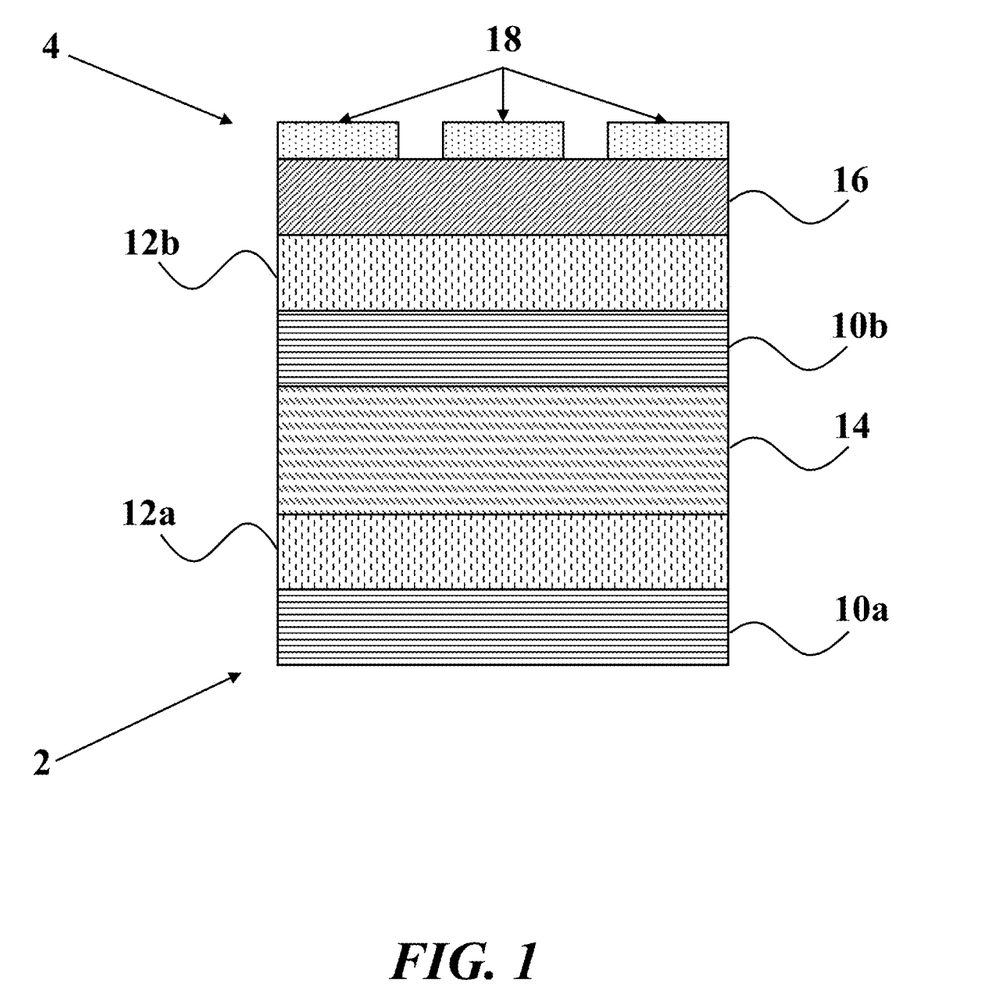
FIG. 1 is a graphical illustration depicting a fabric device that is coated with a plurality of layers designed to charge and deactivate pathogen particles interacting with the fabric device, such that the pathogen particles do not reach a respiratory tract of the wearer, according to an embodiment of the present disclosure.

As shown in FIG. 1, in an embodiment, the fabric device may include a plurality of layers arranged, such that wearer-facing side 2 of the fabric may be comprised of a fiber mesh, and/or such that surrounding environment-facing side 4 of the fabric device may be comprised of a coating designed to capture and/or deactivate airborne particles prior to interacting with the wearer's respiratory tract. In this manner, wearer-facing side 2 may be opposite surrounding environment-facing side 4, with the plurality of layers disposed between wearer-facing side 2 and surrounding environment-facing side 4.

In an embodiment, first fiber layer 10a may be disposed proximate to wearer-facing side 2, forming a fabric mesh material that may be designed to rest upon and/or be disposed adjacent to a wearer's skin. As such, in this embodiment, first fiber layer 10a may be formed of a plurality of fibers forming a mesh. In this manner, at least one of the plurality of fibers may be a hemp fiber. Hemp is known to control microorganism propagation, and/or textiles can be formed from hemp fibers since hemp fibers are cellulosic fibers. Hemp fibers have excellent fiber length and strength, absorbency and durability, and anti-microbial (e.g., anti-fungal and/or anti-bacterial) properties. In addition, hemp fibers contain cannabinoids, which are potent antimicrobials that have been used to fight superbugs, including antibiotic-resistant bacteria and common fungal infections, such as candidiasis. In addition, cannabinoids help treat certain types of viral infections. [1]. Certain cannabinoids have been found to inhibit the replication of the COVID-19 causing SARS-CoV-2 virus. However, hemp is a poor conductor of electricity; as such, hemp fibers must be treated to be used within the current-carrying mesh of the fabric, as will be discussed in greater detail below.

Additionally, as shown in FIG. 1, in an embodiment, first fiber layer 10a of the fabric device may be coated with first tetrafluoroethylene layer 12a, which may be configured to generate a layer of disinfectant ions to intercept particles prior to reaching first fiber layer 10a during the processes described in greater detail below. As such, in this embodiment, first fiber layer 10a and/or first tetrafluoroethylene layer 12a may form an attraction screen designed to capture particles prior to interaction with a user. The attraction screen formed by first fiber layer 10a and/or first tetrafluoroethylene layer 12a may have a charge opposite of the particles, such that the particles may be attracted to the attraction screen, preventing the particles from interaction with the user.

Moreover, as shown in FIG. 1, in an embodiment, second fiber layer 10b and/or second tetrafluoroethylene layer 12b of the fabric device may be disposed proximate to surrounding environment-facing side 4, and/or may be spaced apart from first fiber layer 10a and/or first tetrafluoroethylene layer 12a. In this manner, the distance between second fiber layer 10b and first tetrafluoroethylene layer 12a may provide a space for the existence of electric field 14 therebetween, which will be discussed in greater detail below; however, in an embodiment, second fiber layer 10b may be disposed proximate to first tetrafluoroethylene layer 12a.

Additionally, in an embodiment, second tetrafluoroethylene layer 12b may be disposed proximate to surrounding environment-facing side 4 of the fabric. Similar to the attraction screen formed by first fiber layer 10a and/or first tetrafluoroethylene layer 12a, in this embodiment, second fiber layer 10b and/or second tetrafluoroethylene layer 12b may comprise a charge opposite that of the particles, such that second fiber layer 10b and/or second tetrafluoroethylene layer 12b may be configured to capture particles prior to entering the fabric.

As shown in FIG. 1, in an embodiment, second tetrafluoroethylene layer 12b may also be coated on surrounding environment-facing side 4 with photocatalytic material 16. Nonlimiting examples of photocatalytic material 16 may include titanium dioxide, including sulfur-doped nano-titanium dioxide. In addition, in this embodiment, at least one particle of copper naphthenate 18 (CuN) may also distributed on at least one portion of photocatalytic material 16, forming a coating on surrounding environment-facing side 4 of the fabric. Copper naphthenate 18 is the copper salt of naphthenic acid, and/or copper naphthenate 18 may be used to treat at least one of the plurality of fibers of the fabric device, such as the at least one hemp fiber. As such, in this embodiment, by applying the Copper naphthenate 18 coating on at least one of the plurality of fibers (e.g., the at least one hemp fiber) may improve and/or optimize the electrical conductivity of the fibers while enhancing the biocidal effects, making it suitable for a wide range of applications. Copper naphthenate 18 may not only be permanently effective, but it may also be compatible with human skin and/or the environment, such that the coating may be safe and/or effective for use by humans without risking harmful side effects. Accordingly, in this embodiment, the fabric devices (e.g., protective clothing), as disclosed above and/or herein, may be useful in hospitals, nursing homes, schools, hotels, and/or crowded public areas to prevent infection from pathogens.

Moreover, in some embodiments, the fabric device may be used as a hemp-incorporated nanofibrous polyurethane membrane and/or an asymmetric chitosan membrane prepared by electrospinning as wound dressings. Additionally, in some embodiments, the fabric device may also be durable through multiple cleaning cycles and/or outdoor exposure, and/or the fabric device may have no adverse effects on other fabric properties including wear comfort and/or aesthetic of the fabric device.

Figure 2:
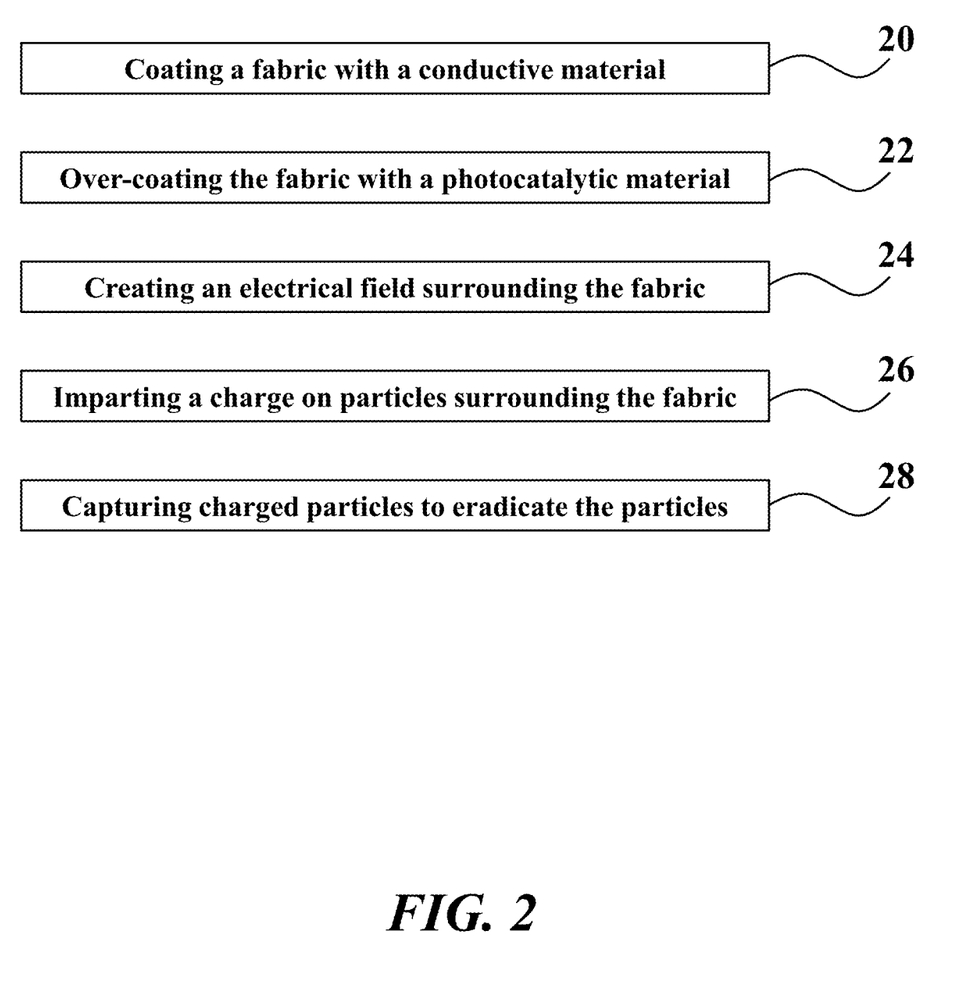
FIG. 2 is a process-flow diagram describing a method of removing pathogens from an ambient environment surrounding a charged fabric material of a fabric device, according to an embodiment of the present disclosure.

Referring now to FIG. 2, in conjunction with FIG. 1, an exemplary process-flow diagram is provided, depicting a method of removing pathogens from an ambient environment surrounding a charged fabric material. The steps delineated in the exemplary process-flow diagram of FIG. 2 are merely exemplary of an order of removing pathogens by charging particles using an electric field created on a wearable fabric. The steps may be carried out in another order, with or without additional steps included therein.

As noted above, in an embodiment, the fabric device may comprise a current-carrying mesh. As shown in FIG. 2, in this embodiment, the mesh may be coated with tetrafluoroethylene (step 20) and/or further may be over-coated with an active photocatalytic material (step 22). In this manner, the photocatalytic material may also then be energized to create powerful dismantling agents on surface, including hydroxyl radicles, from natural ambient air (step 24). As such, in this embodiment, the material may utilize the ambient air to create dismantling agents that may be used to remove pathogens from the surrounding environment.

Additionally, as shown in FIG. 2, in conjunction with FIG. 1, in an embodiment, due to the current in the mesh, the fabric device may be configured to impart and/or enhance positive and/or negative electrostatic charges on surrounding particles to increase decontamination (step 26). Furthermore, in this embodiment, the charged particles of the fabric device may migrate to an activated dismantling mesh within the fabric device that may include an internal oppositely-charged attraction screen (step 28). In this manner, multiple dismantling meshes may be used within the fabric device to capture positively charged particles and/or negatively charged particles, as well as neutral particles.

In an embodiment, suspended water molecules may also be configured to be drawn to the mesh in the same way, providing a supply of raw material of water molecules that may be used to create the decontaminating agents. As such, in this embodiment, the resulting material may be formed into a current-carrying mesh in accordance with the process flow diagram described in detail above. In this manner, a resin precondensate may be included on at least one of the plurality of fibers (e.g., the at least one hemp fiber) to improve laundering durability, as well as an antimicrobial material used to further improve the efficacy of the fabric.

Figure 3:
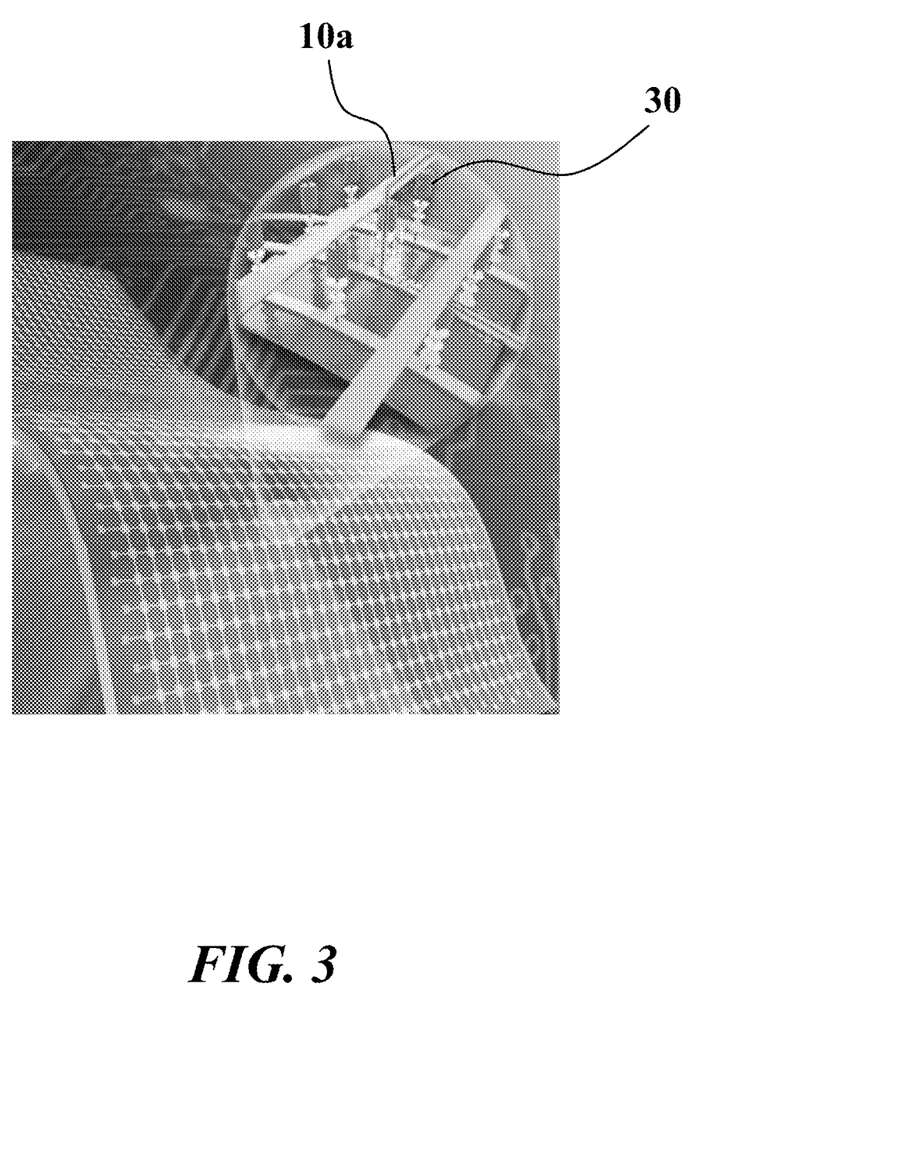
FIG. 3 is a graphical illustration depicting a fabric device including a plurality of antimicrobial microcapsules distributed among electrically charged fibers of the fabric device, according to an embodiment of the present disclosure.

Referring now to FIG. 3, in conjunction with FIG. 1 and FIG. 2, in an embodiment, the fabric device may comprise at least one antimicrobial microcapsule 30, such that the at least one antimicrobial microcapsule 30 may be incorporated into at least one of the plurality of fibers (e.g., the at least one hemp fiber) of first fiber layer 10a and/or second fiber layer 10b, such as during primary spinning of the first fiber layer 10a and/or second fiber layer 10b, and/or as a coating on the surface of the first fiber layer 10a and/or second fiber layer 10b. As such, in this embodiment, the at least one antimicrobial microcapsule 30 may accomplish the controlled release of antimicrobials contained therein, which may be particularly useful in the cases of personal protective equipment employing the fabrics described herein.

In some embodiments, in the case of viruses, even a small electric field may result from a hydrodynamically controlled rotation of the axes to align the overall electric dipoles with the applied field. This results in time-dependent electric birefringence in the virus leading to the field-induced structural changes. In this manner, such field-induced structural transitions may render the virus harmless to the wearer of the fabric device, derived in part from the controlled release of antimicrobials from the at least one antimicrobial microcapsule 30.

The following examples are provided for the purpose of exemplification and are not intended to be limiting.

EXAMPLES

Example #1

Wearable Anti-Pathogenic Fabric Device Lab Study Results
Experimental Results

Figure 4:
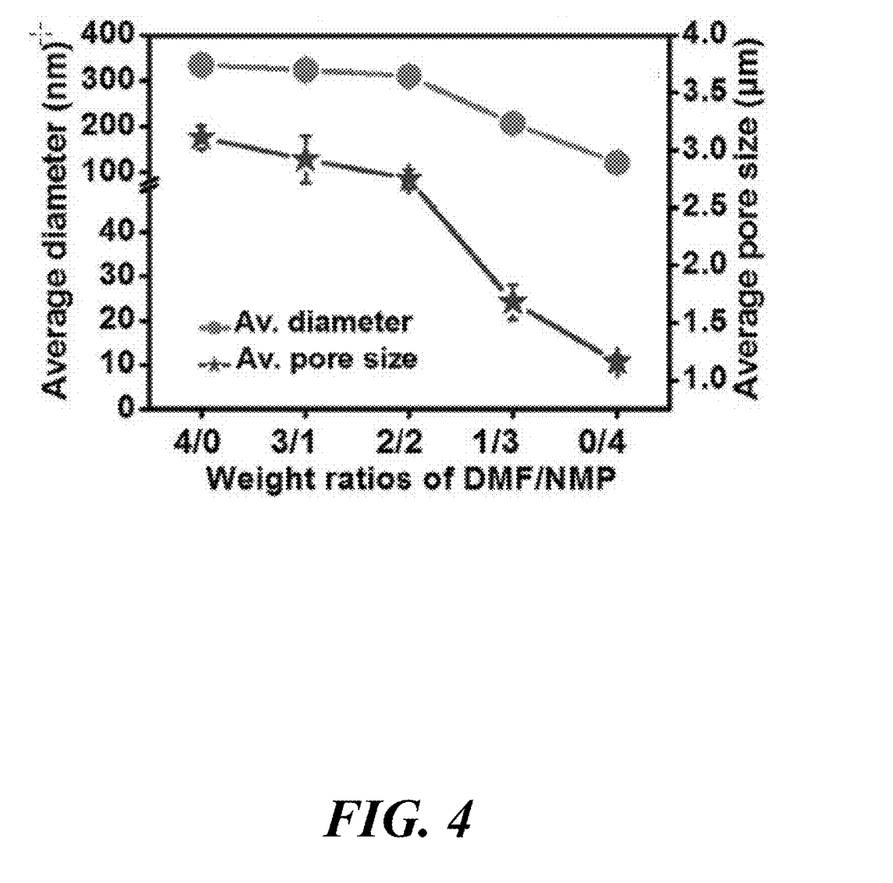
FIG. 4 is a plot depicting measured results of the efficacy of a fabric device employing charged and/or coated fabrics, according to an embodiment of the present disclosure.

As shown in FIG. 4, lab studies were performed using screen printing required for printing the circuits on the fabric device to assess the electric field strength as well as the fabric's ability to denature virus simulants (e.g., exosomes and/or other protein nano-particles). FIG. 4 graphically depicts that minimal pressure drops were detected through the fabric device, which was implemented in a facemask, showing the effectiveness of the charged fabrics described herein in the destruction of all proteinaceous nano-particles. However, it should be appreciated that the fabric device can be implemented in wearable and/or non-wearable items other than facemasks, such as medical scrubs, carpets, table cloths, bed sheets, fitted sheets, and any other fabric commonly interacted with by humans and animals.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

[1] Nguyen, L. C. et al. (2021). Cannabidiol Inhibits SARS-CoV-2 Replication and Promotes the Host Innate Immune Response. bioRxiv: the preprint server for biology, 2021.03.10.432967.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A wearable anti-pathogenic fabric device, the wearable anti-pathogenic fabric device comprising:
    a wearer-facing side opposite a surrounding environment-facing side, the wearer-facing side configured to reside adjacent to at least one portion of a surface of a wearer;
    a first fiber layer;
    a second fiber layer;
    a photocatalytic layer coating the second fiber layer, such that the second fiber layer is disposed between the photocatalytic layer and the first fiber layer;
    at least one copper naphthenate particle distributed on an outward-facing surface of the photocatalytic layer; and
    wherein the second fiber layer and the first fiber layer are configured to capture at least one electrically charged pathogenic particle to prevent the at least one electrically charged pathogenic particle from traversing beyond the first fiber layer.

2. The wearable anti-pathogenic fabric device of claim 1, wherein the first fiber layer is disposed proximate to the wearer-facing side, the first fiber layer including a plurality of interwoven fiber strands forming a first mesh.

3. The wearable anti-pathogenic fabric device of claim 2, wherein at least one of the plurality of interwoven fiber strands of the first fiber layer is made of hemp.

4. The wearable anti-pathogenic fabric device of claim 1, wherein the second fiber layer is disposed proximate to the surrounding environment-facing side, such that the second fiber layer is spaced apart from the first fiber layer, the second fiber layer including a plurality of interwoven fiber strands forming a second mesh.

5. The wearable anti-pathogenic fabric device of claim 4, wherein at least one of the plurality of interwoven fiber strands of the second fiber layer is made of hemp.

6. The wearable anti-pathogenic fabric device of claim 1, wherein the photocatalytic layer is configured to form a first contact surface for at least one pathogenic particle translating in a direction toward the surrounding environment-facing side of the wearable device.

7. The wearable anti-pathogenic fabric device of claim 1, wherein the at least one copper naphthenate particle, the photocatalytic layer, or both are configured to impart an electrical charge onto at least one pathogenic particle translating in the direction toward the surrounding environment-facing side of the wearable device.

8. The wearable anti-pathogenic fabric device of claim 1, further comprising a tetrafluoroethylene layer coating at least one portion of a surface of the first fiber layer, such that the tetrafluoroethylene layer is disposed between the first fiber layer and the second fiber layer.

9. The wearable anti-pathogenic fabric device of claim 1, further comprising a tetrafluoroethylene layer coating at least one portion of a surface of the second fiber layer, such that the tetrafluoroethylene layer is disposed between the second fiber layer and the photocatalytic layer.

10. The wearable anti-pathogenic fabric device of claim 1, further comprising a plurality of microcapsules incorporated into the first fiber layer, the second fiber layer, or both, wherein at least one of the plurality of microcapsules comprises an amount of a microbial substance therein, such that the at least one of the plurality of microcapsules is configured to release the amount of the microbial substance via a controlled release.

11. The wearable anti-pathogenic fabric device of claim 1, wherein the wearable anti-pathogenic fabric device is a face mask configured to cover a respiratory tract of the wearer.

12. A method of making a wearable anti-pathogenic fabric device, the method comprising the steps of:
   interweaving a first plurality of fiber strands into a first fiber layer;
   interweaving a second plurality of fiber strands into a second fiber layer;
   coating the second fiber layer with a photocatalytic layer, wherein the photocatalytic layer forms an outer contact surface, such that the second fiber layer is disposed between the photocatalytic layer and the first fiber layer; and
   distributing at least one copper naphthenate particle about at least one portion of the photocatalytic layer.

13. The method of claim 12, wherein the first fiber layer, the second fiber layer, the photocatalytic layer, and the at least one copper naphthenate particle form the wearable device configured to reside adjacent to about at least one portion of a surface of a wearer.

14. The method of claim 12, further comprising the step of coating at least one portion of a surface of the first fiber layer with a tetrafluoroethylene layer, such that the tetrafluoroethylene layer is disposed between the first fiber layer and the second fiber layer.

15. The method of claim 12, further comprising the step of coating at least one portion of a surface of the second fiber layer with a tetrafluoroethylene layer, such that the tetrafluoroethylene layer is disposed between the second fiber layer and the photocatalytic layer.

16. The method of claim 12, further comprising the step of incorporating a plurality of microcapsules into the first fiber layer, wherein at least one of the plurality of microcapsules comprises an amount of a microbial substance therein, such that the at least one of the plurality of microcapsules is configured to release the amount of the microbial substance via a controlled release.

17. The method of claim 12, further comprising the step of incorporating a plurality of microcapsules into the second fiber layer, wherein at least one of the plurality of microcapsules comprises an amount of a microbial substance therein, such that the at least one of the plurality of microcapsules is configured to release the amount of the microbial substance via a controlled release.

18. The method of claim 12, wherein wearable anti-pathogenic fabric device is a face mask configured to cover a respiratory tract of the wearer.

\* \* \* \* \*